United States Patent Office.

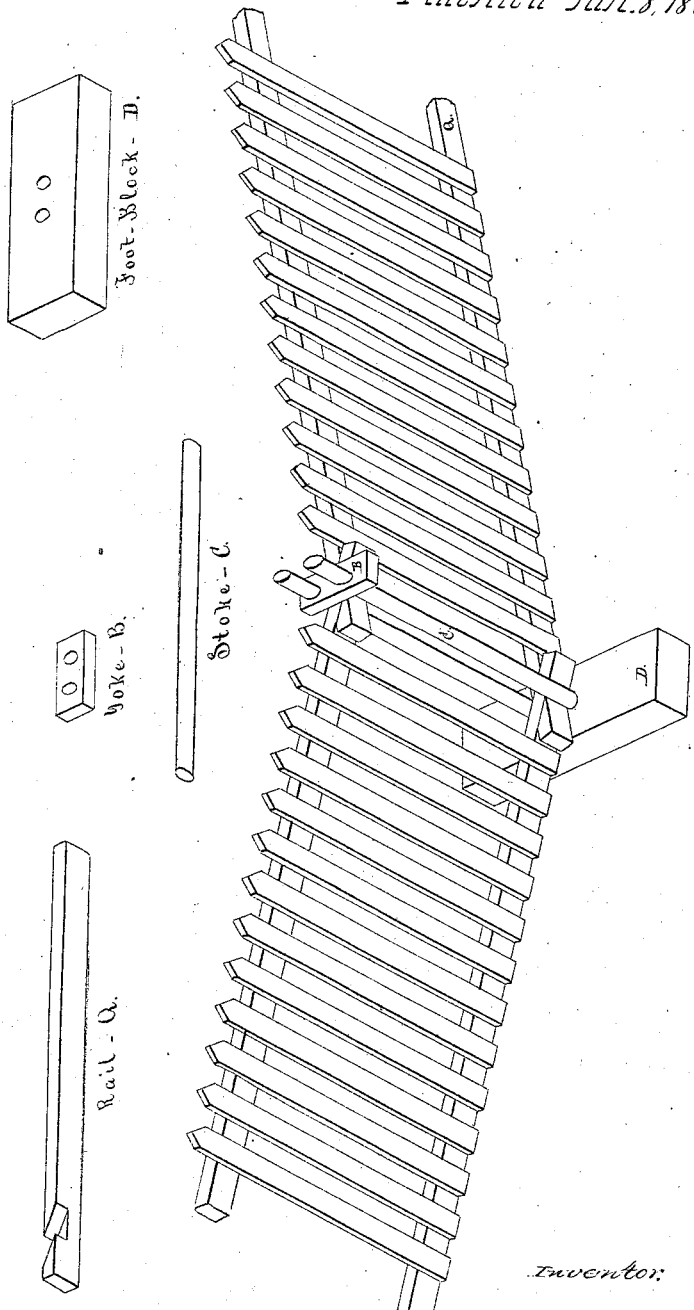

PHILIP S. DUSENBURY, OF BOSCOBEL, WISCONSIN.

Letters Patent No. 61,057, dated January 8, 1867.

IMPROVEMENT IN PORTABLE FENCE.

The Schedule referred to in these Letters Patent and making part of the same.

TO ALL WHOM IT MAY CONCERN:

Be it known that I, PHILIP S. DUSENBURY, of Boscobel, Grant county, Wisconsin, have invented a new and improved Portable Fence; and I do hereby declare that the following is a full and exact description thereof, reference being had to the accompanying drawings, and to the letters of reference marked thereon.

The nature of my invention consists in providing a portable fence made of sections of fence which are joined together by means of notches in the horizontal bars near the end thereof, kept in place by two perpendicular stakes being capped or yoked together, and passing into a foot-block which rests upon the ground; and I do hereby declare that the following is a full, clear, and exact description of the construction and operation of the same, reference being had to the annexed drawings, making a part of this specification, in which—

Figure A represents one of the horizontal rails or bars of said fence to which the pickets are nailed.
Figure B represents the cap or yoke, with apertures which fasten the two upright stakes at the top.
Figure C represents one of the upright stakes.
Figure D, with the two apertures, represents the foot-block which fastens the bottom of the two upright stakes.

The large figure is a combination of the foregoing figs. A B C and D, showing the fence as joined together, the notches in the said rails, near the end thereof, being fitted into each other, passing between and supported in place by the two uprights or stakes, held together by the cap or yoke on top, and the foot-block at the bottom, which rests upon the ground.

What I claim as my invention, and desire to secure by Letters Patent, is—

The arrangement and combination of the foot-block D, yoke B, stake C, and notched and interlocking rails A, as and for the purpose specified.

PHILIP S. DUSENBURY.

Witnesses:
G. C. HAZELTON,
CHAS. KIMBALL.